United States Patent [19]

Nishioka et al.

[11] Patent Number: 4,658,413
[45] Date of Patent: Apr. 14, 1987

[54] FLUOROSCOPIC AND RADIOGRAPHIC X-RAY IMAGING SYSTEM

[75] Inventors: Hiroyuki Nishioka; Takeshi Nakanishi, both of Kyoto, Japan

[73] Assignee: Shimadzu Corporation, Kyoto, Japan

[21] Appl. No.: 874,472

[22] Filed: Jun. 16, 1986

[30] Foreign Application Priority Data

Jun. 14, 1985 [JP] Japan .................................. 60-130610

[51] Int. Cl.$^4$ .............................................. H05G 1/64
[52] U.S. Cl. ...................................... 378/99; 358/111; 378/112; 378/114; 378/115; 378/116
[58] Field of Search ........................... 378/99, 109–112, 378/114–117; 358/111

[56] References Cited

U.S. PATENT DOCUMENTS 3,919,467 11/1975 Peugeot .................................. 378/99

Primary Examiner—Craig E. Church
Assistant Examiner—John C. Freeman
Attorney, Agent, or Firm—Fidelman, Wolffe & Waldron

[57] ABSTRACT

An X-ray imaging system which enables recording of an X-ray image of an object at a desired time without substantial delay while fluoroscopically observing the X-ray image with the eye, and in which the filament current of the X-ray tube is kept at a constant level at all times, and the tube voltage is supplied in synchronism with the vertical scanning of a TV camera in the form of pulses, the width of which is changed depending upon whether the X-ray image is fluoroscopically observed with the eye or a picture thereof is radiographically recorded.

4 Claims, 3 Drawing Figures

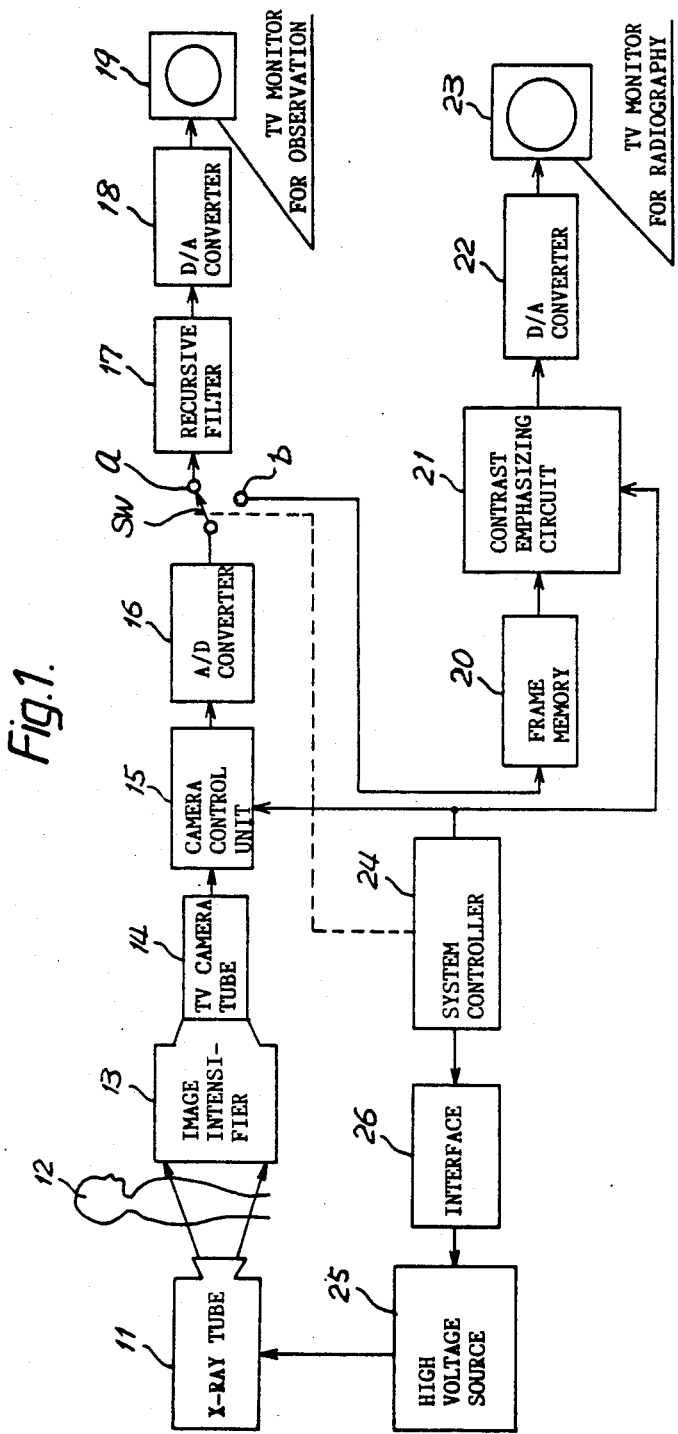

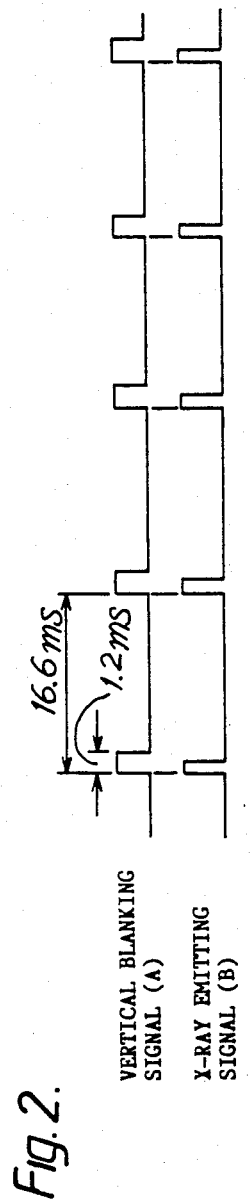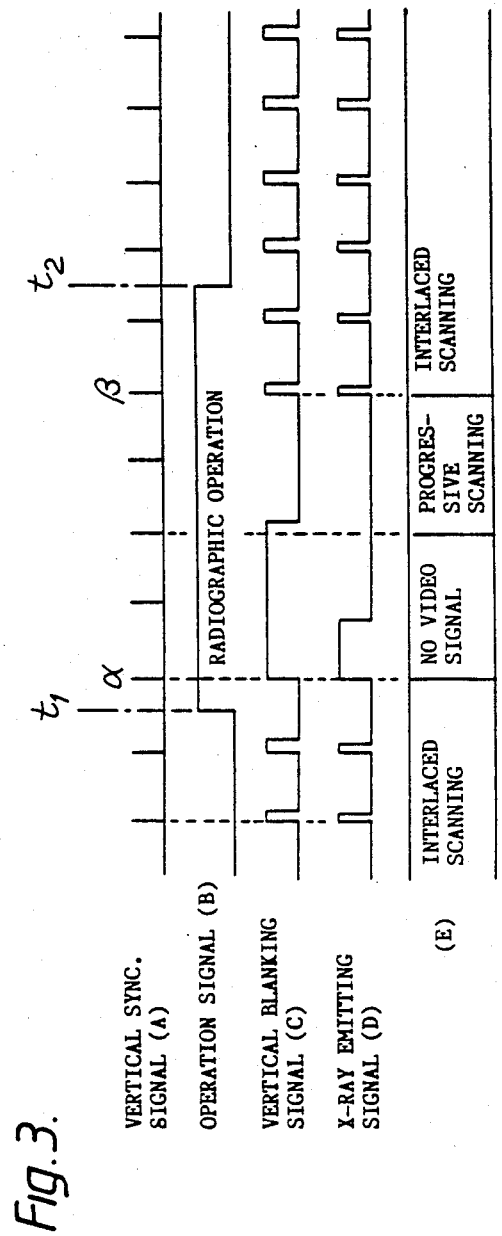

FLUOROSCOPIC AND RADIOGRAPHIC X-RAY IMAGING SYSTEM

BACKGROUND OF THE INVENTION

This invention relates to an X-ray imaging system which enables taking an X-ray picture of an object at a desired time while fluoroscopic observation is being conducted on the object.

For radiographic examination of the gastro-intestinal tract, it has been customary to administer a dose of contrast medium orally to a person to be examined and observe an area or part of interest of the tract fluoroscopically on a TV monitor, so that the moment the area takes a position and/or assumes a state intended for examination, a high speed exposure is made to a silver halide film, which is developed to produce a picture of the area to be used for diagnosis. In the conventional method of taking X-ray pictures at a high shutter speed by using a silver halide film, it is extremely difficult and requires a great deal of skill to make an exposure exactly at the time a picture useful for diagnosis should be taken since there is a time lag of about 1 (one) second between the time the instructions to take a picture were given and the time an exposure has actually been made. The time lag is chiefly caused by:

(a) the time required for transfer of a film by mechanical means to a position where exposure is to be made, (b) the time required for the temperature of the filament of the X-ray tube to be raised from the temperature it has when the X-ray flurorscopic view of an object is observed with a relatively low X-ray intensity to the temperature the filament of the X-ray tube has when a picture is to be taken with a higher X-ray intensity, and (c) the time required for increasing the rotational speed of the target in the X-ray tube, which is rotated to prevent overheating of the focal spot, from a lower speed for fluoroscopic observation of the object to a higher one for photographing thereof.

SUMMARY OF THE INVENTION

The object of the invention is to obtain a proper timing for making an exposure in radiography by eliminating the above-mentioned causes for the time lag.

Of the above three causes (a), (b) and (c), cause (a) can be eliminated by employing a video-recording system for recording the video signals of an X-ray image as picture data, and cause (c) can be eliminated by keeping the target of the X-ray tube rotated at all times at the same high speed as when an X-ray picture is actually taken. Therefore, the present invention is directed chiefly to elimination of cause (b).

To this end, in accordance with the invention, the filament current of the X-ray tube is always kept at the same level as when a picture is taken, and the tube voltage is supplied in the form of pulses in synchronism with the vertical blanking period of the TV camera, and the pulse width of the tube voltage is changed depending upon whether a picture of an object under examination is taken or the object is fluoroscopically observed with the eye.

In accordance with the invention, since the filament current of the X-ray tube for fluoroscopic observation is kept at the same high level as when an X-ray picture is taken, the delay which would otherwise be caused by the time required for the temperature of the filament of the X-ray tube to be raised is eliminated. On the other hand, the amount of X-rays emitted per unit time is regulated by changing the pulse width of the tube voltage, so that the person under fluoroscopic observation will receive a small radiation dose, and yet when an X-ray picture is taken, the amount of X-rays required for producing an image of high quality can be obtained.

The invention will be described in detail with reference to the accompanying drawings.

DESCRIPTION OF THE DRAWINGS

FIG. 1 is a block diagram of one embodiment of the invention;

FIG. 2 is a waveform diagram for explaining the operation of the system shown in FIG. 1 in fluoroscopy mode; and FIG. 3 is a waveform diagram for explaining the operation of the system in radiography mode.

DESCRIPTION OF THE PREFERRED EMBODIMENT

Referring first to FIG. 1, there is schematically shown an X-ray tube 11, which projects a beam of X-rays onto a human body 12 being examined. As the beam passes through the body, an X-ray image of the irradiated area of the body is formed in accordance with the X-ray absorption characteristics of the body area. An image intensifier 13 receives the X-ray image and converts it to a visible optical image, which is viewed by a TV camera tube 14, controlled by a camera control unit 15 which operates in the same manner as in a conventional TV broadcasting system. The TV camera tube 14 converts the optical image on the screen of the image intensifier 13 to a corresponding video signal, which is transmitted to an A/D converter 16.

When the X-ray image of the body is to be fluoroscopically viewed by the observer, a switch SW is closed at a contact a, so that the digitized output from the A/D converter 16 is applied through a recursive filter 17 to a D/A converter 18, in which the digital signal is converted again to the original analog video signal. A TV monitor 19 for fluoroscopic observation operating in synchronism with the TV camera 14 receives the analog video signal to display on its screen the X-ray image as a visible image for observation with the eye.

When the operator selects a proper timing to cause the switch SW to be changed over to the opposite contact b, the digital video signal from the A/D converter 16 corresponding to one frame of the X-ray image is applied to a frame memory 20 to be stored therein. The stored data correspond to the optical image which would be stored on an exposed silver halide film. In the system shown in FIG. 1, however, there is no need for providing a device for developing exposed films, but by simply connecting an image monitor to the frame memory it is readily possible to view the X-ray image at any time. In the illustrated embodiment a contrast emphasising circuit 21, a D/A converter 22 and a TV monitor 23 for radiography constitutes an image reproducing device. With this arrangement, recording of the X-ray image can be initiated with the maximum time delay of 1/60 second after the operator changed the arm position of the switch SW, so that the previously mentioned time lag due to cause (a) can be completely eliminated.

One of the important features of the invention lies in the manner of controlling the tube voltage of the X-ray tube 11. Referring now to FIG. 2, the vertical blanking signal of the TV camera is shown at A having a period of about 16.6 ms and a pulse width of 1.2 ms since the illustrated system of the invention employs an interlaced scanning system in which two fields form one frame of the picture, with a frame frequency of 30 per second as in the conventional TV broadcasting system. FIG. 2 also shows an X-ray emitting signal B produced while fluoroscopic observation is being conducted. The signal B rises simultaneously with the vertical blanking signal A and has a smaller pulse width than the latter signal. For a fraction of time corresponding to the pulse width of the signal B a high voltage is impressed on the X-ray tube, which emits X-rays. As previously mentioned, while fluoroscopic observation is being conducted, the filament current of the X-ray tube is kept at the same level as it is when radiographing is conducted, so that when fluoroscopic observation is conducted, the X-ray intensity during existence of the X-ray emitting signal B is at the same level as it is when an X-ray picture is taken. However, the radiation dose received by the patient is kept below the maximum permissible level.

Referring to FIG. 3, the vertical synchronizing signal of the TV camera is shown at A and the vertical blanking signal of the TV camera (which is the same as the signal A in FIG. 2) is shown at C. FIG. 3 also shows an operation signal B, which rises at time $t_1$ when the operator has closed the switch SW in FIG. 1 at the contact b for radiographic operation. A system controller 24 in FIG. 1 detects the closing of the switch SW at the contact b, whereupon the controller causes the vertical blanking signal C to continue for a period of one frame (or two fields) from the vertical synchronizing signal $\alpha$ which comes first after time $t_1$, so that during this period the scanning beam is prevented from scanning the image receiving surface of the camera tube 14, with resulting integration of the photoelectric current at each pixel on the image receiving surface.

The X-ray emitting signal shown at B in FIG. 2 is shown at D in FIG. 3. The signal D remains the same as the signal B until time $t_1$. Upon production of the vertical synchronizing signal $\alpha$, however, the signal D continues for an appropriate period of time, after which the signal D is not produced till the end of the period of two frames (or four fields) from the vertical synchronizing signal $\alpha$, and at the beginning of the fifth field from the signal $\alpha$ the signal D is restored to its original waveform for conducting fluoroscopic observation of the X-ray image with the eye.

Thus, the TV camera tube 14 is scanned in the manner shown at E in FIG. 3. In particular, normal interlaced scanning with two fields forming one frame is conducted with the frame frequency of 30 per second until the synchronizing signal $\alpha$ is produced, whereupon the vertical blanking signal C lasts for a period of two fields from the signal $\alpha$ thereby to prevent production of video signals during the period, after which progressive scanning is conducted on the TV camera tube 14 once for a period of the next two fields for the reasons to be described later, and the video signal obtained by the progressive scanning is stored in the frame memory 20 shown in FIG. 1. The video data stored in the frame memory 20 can be taken out through the contrast emphasizing circuit 21 and the D/A converter 22 on the screen of the TV monitor 23 as a visible image, which can be photographed by a suitable camera, not shown.

When the synchronizing signal $\beta$ comes, the normal interlaced scanning is resumed, and at time $t_2$ the switch SW is operated to close at the contact a, whereupon the X-ray image again appears on the screen of the TV monitor 19.

The above described operation is controlled by a system controller 24. The X-ray emitting signal (shown at B in FIG. 2 and D in FIG. 3) produced by the controller 24 is applied through an interface 26 to a high voltage source 25 so as to control the high voltage applied to the X-ray tube 11.

As previously mentioned, in the radiography mode of operation of the system, it is not interlaced scanning but progressive scanning that is conducted for one frame of the X-ray image to obtain video signals to be stored in the frame memory 20 for subsequent photographing. The reason is as follows: If interlaced scanning were conducted with two fields of one frame of the picture being consecutively scanned, generally the video signal obtained by scanning the second field would have been considerably attenuated as a whole as compared with the signal obtained by scanning the first field, so that the resulting picture would have a very low quality with the brightness of the picture varying on alternate scanning lines. This is for the following reasons. Normally, the TV camera tube stores each field of a picture frame. In the radiography mode of operation, however, X-ray emission is continued for a certain period of time, during which the TV camera tube 14 stores the whole frame at one time without dividing the frame into two fields to be separately and consecutively stored. Therefore, if the single frame were scanned twice by interlaced scanning, a certain amount of the stored charge would have been lost between adjacent two lines previously scanned in the first scanning opeation due to the area of the scanning beam spot occupying on the screen of the TV camera tube. If the area of the screen with the reduced stored charge were scanned in the subsequent scanning operation, the resulting second field would have a lower quality than the first, with resulting deterioration of the quality of the picture composed of the two fields. This is avoided by the single scanning conducted in the system of the invention.

In the illustrated embodiment, the filament current is kept at a constant level. The filament current may differ in the two different modes of operation provided that the difference is so small that the temperature of the filament can be raised in a fraction of a second.

As described above in detail, the instant the system of the invention has been changed from the observation mode to the radiography mode, the operation of taking a radiograph can be commenced without delay. The operator need not be particularly experienced or skilled in the art but can take a good X-ray picture of the object at a required time.

What we claim is:
1. An X-ray imaging system comprising:
   an X-ray tube for producing a beam of X-rays to irradiate an object to be examined;
   an image intensifier for producing an X-ray image of said irradiated object;
   a TV camera for converting said X-ray image to a corresponding video signal;
   a TV monitor for receiving said video signal to reproduce said X-ray image as a visible image to be observed with the eye;
   a frame memory for storing said video signal;

switch means for applying said video signal selectively to said TV monitor and said frame memory; and a system controller means for operating in a first mode in which said switch means transmits said video signal to said TV monitor and alternatively in a second mode in which said switch means transmits said video signal to said frame memory, said controller operating in said first mode to impress a pulse-like voltage to said X-ray tube in synchronism with vertical scanning in said TV camera within the period of vertical blanking and alternatively in said second mode to interrupt the scanning of said TV camera for a first predetermined period of time and at the same time continuously impress a predetermined tube voltage to said X-ray tube for a second predetermined period of time within said first predetermined period of time, and upon lapse thereof said TV camera is scanned for one frame to obtain a video signal so as to be stored in said frame memory.

2. The system of claim 1, further including a second TV monitor for receiving said stored video signal from said frame memory to reproduce said X-ray image as a visible image.

3. The system of claim 1, wherein said system means controller keeps the filament current of said X-ray tube at a constant level in said two modes.

4. The system of claim 1, wherein said scanning of said TV camera for one frame is conducted by progressive scanning.

* * * * *